April 28, 1936.   R. CLADE ET AL   2,038,888
LUBRICATED VALVE
Filed March 15, 1933   2 Sheets-Sheet 1
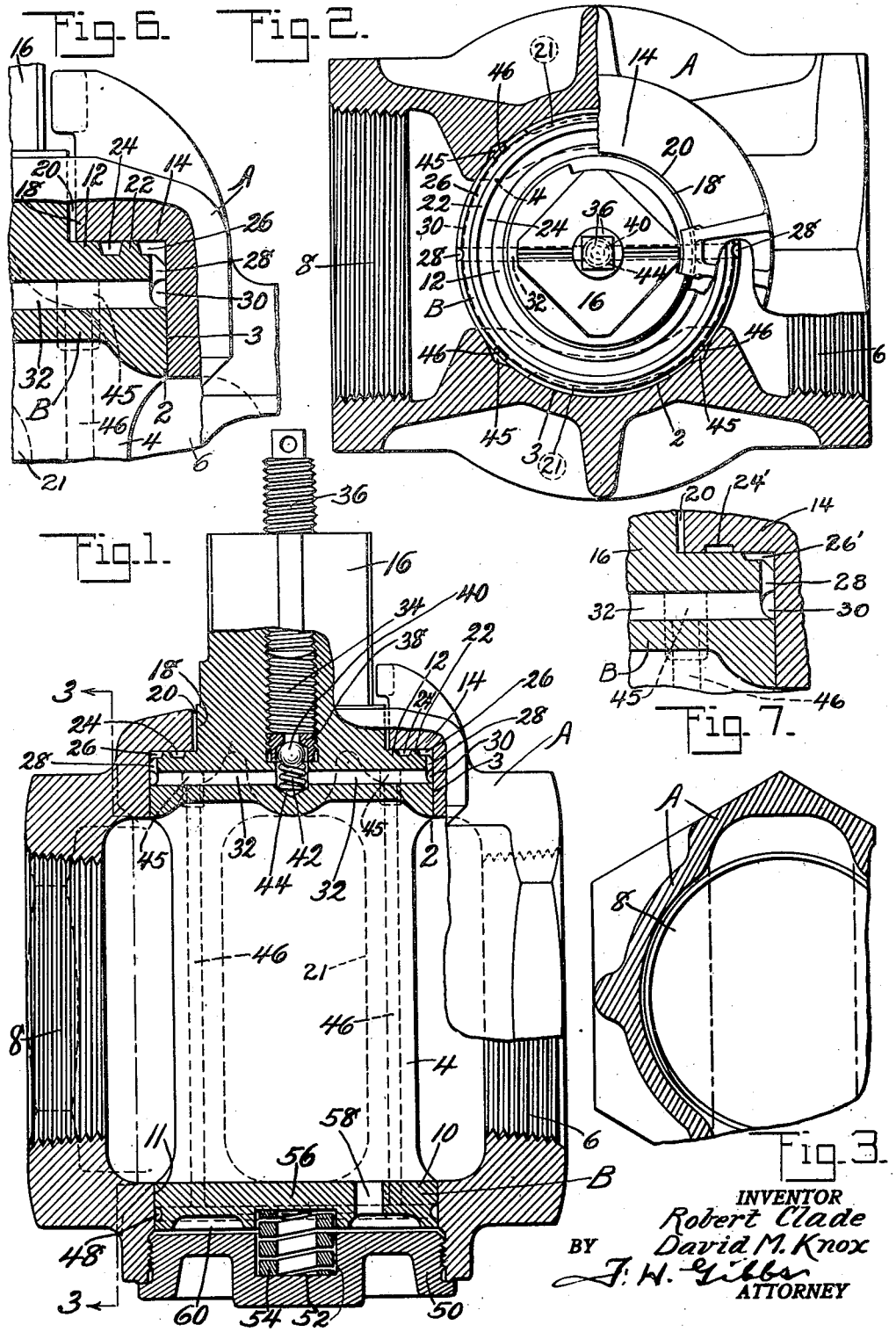
INVENTOR
Robert Clade
David M. Knox
BY J. W. Gibbs
ATTORNEY April 28, 1936.  R. CLADE ET AL  2,038,888
LUBRICATED VALVE
Filed March 15, 1933  2 Sheets-Sheet 2
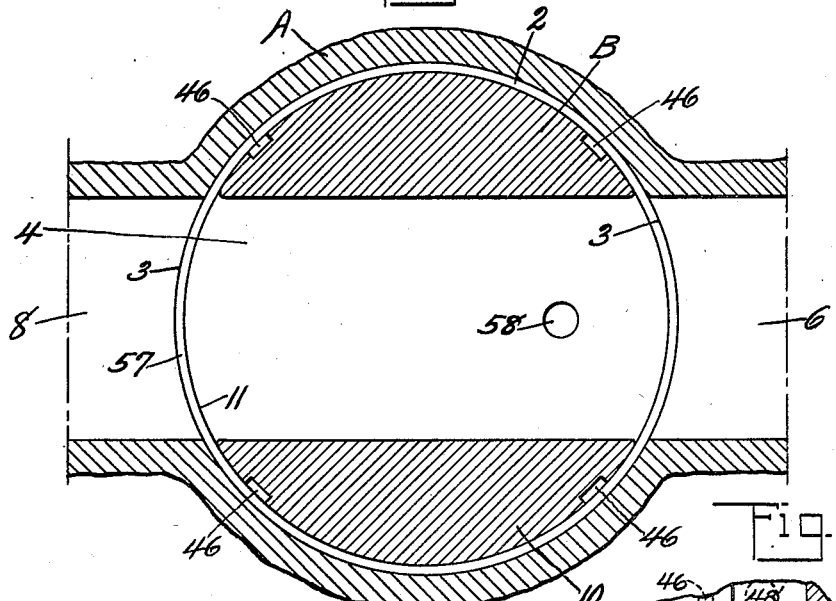
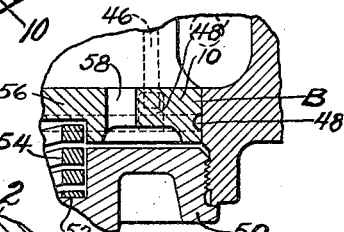
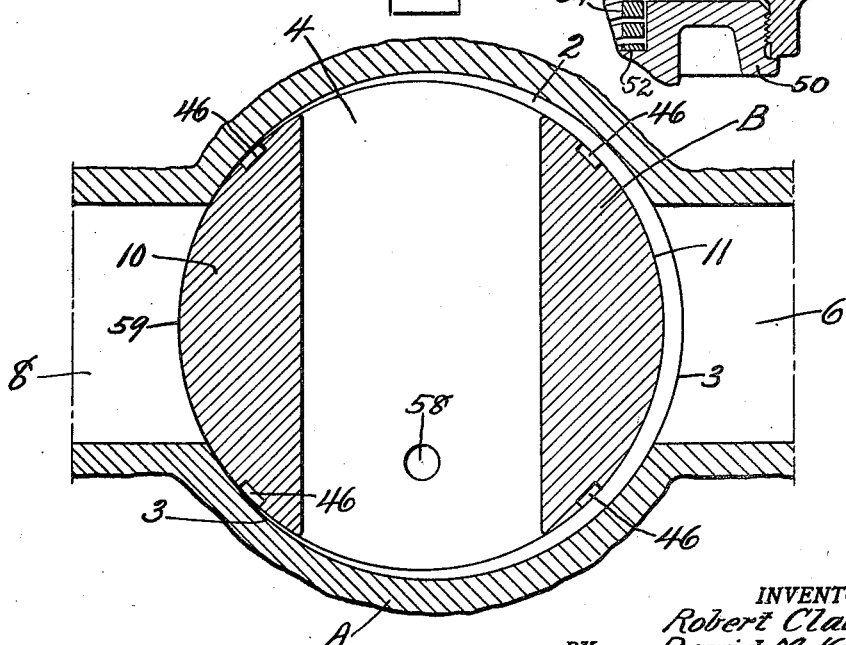
INVENTOR
Robert Clade
David M. Knox
BY T. H. Gibbs
ATTORNEY Patented Apr. 28, 1936

2,038,888

UNITED STATES PATENT OFFICE 2,038,888

LUBRICATED VALVE

Robert Clade, Detroit, Mich., and David M. Knox, New York, N. Y., assignors to American Car and Foundry Company, New York, N. Y., a corporation of New Jersey Application March 15, 1933, Serial No. 660,842

12 Claims. (Cl. 251—93)

This invention relates to valves and has particular reference to valves of the type in which lubricant under pressure is forced between the contacting surfaces of a valve body and a valve plug to seal the valve against leakage.

One object of the present invention is the provision of a new and improved lubricated valve.

Another object of this invention is the provision of a new and improved cylindrical valve plug.

Still another object of this invention is the provision of a lubricated valve including a valve body and a plug therein, the valve being so formed as to provide a visual signal for indicating when the valve is properly lubricated.

A further object of this invention is the provision of a lubricated valve including a valve body with a plug axially movable therein upon increase in pressure beyond a predetermined point whereby to effect escape of excess lubricant from the valve to prevent the building up of bursting pressures within the valve.

A still further object of this invention is the provision of a lubricated valve having a rotatable plug which is so mounted as to be capable of axial shifting upon increase in pressure within the valve in excess of that required for proper lubrication.

It is another object of this invention to provide a valve of the lubricated type which is so formed as to prevent the building up of pressure within the valve plug in excess of line pressure exerted against the plug.

Other objects and advantages of this invention will be apparent from the following description taken in conjunction with the accompanying drawings in which:

Figure 1 is a sectional view through the valve of the present invention.

Fig. 2 is a view showing the valve body for the greater part in section and the valve plug in plan.

Fig. 3 is a sectional view on the line 3—3, Fig. 1.

Fig. 4 is a diagrammatic view, in section, showing the relative positions of the valve plug and valve body when the valve is in open position.

Fig. 5 is a diagrammatic view, in section, showing the relative positions of the valve plug and valve body when the valve is in closed position.

Fig. 6 is an enlarged fragmentary detail view, in section, of a portion of the valve plug and valve body at the head portion of the valve.

Fig. 7 is a fragmentary detail view, in section, of a portion of the valve plug and valve body at the head portion of the valve showing a modified construction, and Fig. 8 is an enlarged fragmentary detail view, in section, of a portion of the valve plug and valve body at the lower end portion of the body, the view showing a modified form of groove arrangement.

Referring now more particularly to the drawings in which similar characters of reference designate similar parts in the several views, the valve of the present invention comprises a body indicated generally at A provided with a central longitudinal bore 2 providing a cylindrical seat 3 for a valve plug indicated generally at B. The plug B is hollow, having a transverse bore 4 therethrough adapted to be alined with oppositely arranged body ports 6 and 8 respectively to establish flow through the valve.

In the instance shown in the drawings the plug is generally cylindrical and comprises a body portion 10 having a seating surface 11, the body portion being of such diameter as to rotatably fit the seat 3 in the valve body and having an annular shoulder 12 at its upper end portion arranged to engage the lower surface of a valve head 14 formed, in the instance shown, integral with the body and having a substantially centrally arranged aperture through which the stem 16 of the plug projects. Obviously, within the spirit of the invention, the head portion may be formed as an independent element attached to the body in any suitable or desired manner. The upper end portion of the stem is preferably square or otherwise suitably formed to receive a tool by which the plug may be rotated, while the lower portion of the stem indicated at 18 is circumferentially spaced from the head portion of the valve body at the opening therein as shown at 20 to provide a lubricant escape passage as more fully described hereinafter. To reduce the frictional surface of the plug, oppositely arranged longitudinal recesses 21 are formed in the seating surface 11 of the plug, as shown in broken lines in Figs. 1 and 2.

In the form shown in Figs. 1 and 6, the upper end portion of the body 10 of the plug is provided with an upwardly projecting annular rib 22 arranged intermediate the shoulder 12 and the marginal edge of the plug body and providing with the shoulder 12 a circular lubricant chamber or recess 24 formed in the upper portion of the body of the plug. As shown in the drawings, the upper surface of rib 22 is substantially in the same horizontal plane as the contacting surface of the shoulder 12 and is so formed as to provide a bearing surface of appreciable width which contacts directly with the lower surface of the head 14 in sealing relation and said rib 22 obviously cooperates with the valve body and plug to provide a lubricant recess or chamber 26 at the upper end portion of said plug adjacent the side wall thereof. Within the spirit of the present invention it will be obvious to those skilled in the art that the upper end portion of the plug and the head portion of the valve body may be relatively so formed as to provide lubricant chambers in each thereof. One illustration of this is shown in Fig. 7 in which a circumferential recess 26' is formed around the upper end portion of the plug to provide an outer lubricant chamber. In the instance shown, recess 26' is peripherally arranged with respect to the plug. The upper end portion of the plug bears against the lower surface of the head portion 14 in metal-to-metal sealing contact and a downwardly opening recess formed in the head portion provides a lubricant chamber 24' (see Fig. 7), said recess being covered or closed by the upper end portion of the plug. In practice, the lubricant chambers 24' and 26' are preferably concentrically arranged. In each of the forms shown in Figs. 6 and 7 the lubricant chambers 24 and 26, and 24' and 26' are termed inner and outer lubricant chambers respectively and obviously are defined between overlapping portions of the head and plug.

Formed in the plug body portion 10 at its upper end are oppositely arranged vertical grooves 28 which communicated with the outer lubricant chamber 26 and extend downwardly into communication with an upper circumferentially arranged lubricant groove or recess 30 formed in the body portion of the plug adjacent the upper end of the latter. The body portion 10 of the plug adjacent its upper end is provided with a transversely arranged lubricant channel 32, the ends of which extend to the upper recess 30 and said channel receives lubricant under pressure from a reservoir 34 formed in the stem 16 of the plug and provided with a ram 36 threadedly engaged therein. Secured in the lower portion of the reservoir 34 is a valve seat member 38 in which a ball check valve 40 is normally seated by means of a spring 42 arranged in spring seat 44 formed in the plug at the lubricant channel 32. It will be apparent that when lubricant is inserted in the reservoir 34 and the ram 36 actuated, the lubricant will be forced past the check valve into the channel 32 and to the lubricant recess 30 and said recess will be filled, thus providing a circular lubricant seal in the valve body adjacent the upper end portion of the plug. The lubricant, being under pressure, will pass through the grooves 28 into the outer lubricant chamber 26, of the form shown in Fig. 6 and into the outer lubricant chamber 26' in the form of valve shown in Fig. 7.

Formed in the valve body adjacent the head 14 are dwarf grooves 45 which are so arranged as to communicate with the lubricant recess 30. In the instance shown four of these dwarf grooves are provided in the valve body and they extend longitudinally of the body on opposite sides of the body ports 6 and 8 as shown clearly in Fig. 2 and they are of a length sufficient to overlap the upper end portions of lubricant grooves 46 formed longitudinally in the valve plug. In the form shown in Figs. 1 and 6, these plug grooves 46 extend between and connect the circumferential groove 30 with a lower circumferential groove or recess 48 formed in the plug adjacent its lower end. The grooves 46 are arranged respectively adjacent opposite sides of the bore 4 and hence, regardless of the position of the plug in the body a continuous circuit which receives lubricant from recess 30 is provided around the bore 4 of the plug. The dwarf grooves 45 are so arranged that when the valve is in either fully closed or fully open position they overlap the body grooves so as to provide for a more free and unrestricted entrance of lubricant to the body grooves from groove 30.

In the form of valve shown in Fig. 8 one of the lubricant grooves 46 adjacent opposite sides of the bore 4 of the plug has its lower end portion terminating above the lower circumferential groove 48 and when the valve is in either fully open or fully closed position communication between said grooves 46 and the groove 48 is established by dwarf grooves 48' formed in the valve body. It will be apparent that with the valve in either fully open or fully closed position a complete lubricant circuit is established around the ingress and egress openings 6 and 8 of the valve body and said circuit may receive lubricant under pressure, while when the plug is in positions between fully open or fully closed a complete lubricant circuit is not provided as certain of the grooves 46 are out of register with the dwarf grooves 48.

The lower end portion of the body A is closed by a removable base plate 50 having a spring seat 52 therein for supporting a compression spring 54 which engages the bottom 56 of the valve plug and normally retains the shoulder 12 and rib 22 in metal-to-metal contact with the head 14 of the valve body. Formed in the bottom 56 of the valve plug is an opening 58 which communicates with the bore 4 of the plug and with the chamber 60 defined between the bottom 56 and base plate 50.

The valve plug, as before mentioned, is rotatably fitted to the seat 3 of the valve body. Obviously, to be capable of rotation within the body on the seat 3, there must be clearance between the seat 3 and the body of the plug. In use, with the valve in closed position and line pressure exerted against the body 10 of the plug, the plug will shift radially within the valve body a distance corresponding to the amount of clearance between the seat and plug. Fig. 4 illustrates the position of the plug in the body when the bore 4 of the plug registers with the body ports, the valve being in open position. In this position the plug is substantially centrally arranged within the body and the clearance between the plug and plug seat 3, indicated at 57, is substantially uniform entirely around the seating surface of the plug. With the valve in closed position, as indicated in Fig. 5, line pressure acts against the plug through the ingress body port and causes the plug to shift radially within the valve body. The portion of the plug opposite that subjected to line pressure is caused to engage the valve body in sealing relation. This radial shifting of the plug obviously results in an eccentric position of the plug within the valve body to an extent that clearance between the plug and body at the ingress port of the body is increased and the clearance between plug and body diminishes circumferentially of the plug toward the egress port in the body, as shown at 59, Fig. 5. With the plug so arranged in the body it is apparent that lubricant under pressure will pass into the interior of the plug through the plug port due to the clearance between the plug and the body. This will occur particularly should the ram 36 be actuated to force lubricant from the lubricant reservoir into the valve body between the seating surface of the plug and plug seat 3. In practice, due to the fact that grease is a semi-solid and hence does not conform to the law of the transmission of pressures of liquids, the pressure at the upper portion of the valve body is much greater than that adjacent to or below the lower end portion of the plug and due to this reduction in pressure between the upper and lower portions of the valve it is obvious that the lubricant which passes into the interior or bore 4 of the plug will flow through the port 58, which may be termed a leak port, into the chamber 60 below the plug and from there it will flow because of pressure within the valve plug into the ingress port of the valve body. The space 60 is not a chamber holding lubricant under pressure such as that shown for example in patents to F. Milliken, Re- 17,337, June 25, 1929, or 1,915,068 of June 20, 1933. In each of these patents the chamber provided below the valve plug is one adapted for and holding lubricant under pressure. In the valve of the present invention, the arresting groove 48 prevents the passage of lubricant under pressure from between the valve plug and valve body to the space below the plug. In other words, when lubricant is forced under pressure by the ram 36 it will flow into the upper lubricant chamber or chambers 24 and 26 and down the grooves 46, but does not pass below the arresting groove 48, and the space 60 between the lower end portion of the plug and the base plate 50 is provided merely for the purpose of permitting leakage of lubricant which has passed into the interior of the plug by reason of its eccentric positioning within the valve body out of the plug and then to the ingress line; it being well known that when a valve is turned from open to closed position fluid under pressure is trapped within the plug. This pressure plus the pressure of the lubricant leaking into the interior of the plug when the plug is in the position shown in Fig. 5, will be in excess of the line pressure, therefore the lubricant will pass through the leak port 58 and be delivered to the ingress line from where it will be discharged through the valve by line pressure when the valve is again opened. When the valve is open to permit flow therethrough it is apparent that any lubricant which may have passed into the ingress line from beneath the valve plug will be carried away by line pressure through the valve. As the plug is turned from open to closed position it is well known that fluid is trapped therewithin and, in the absence of the leak port 58, this fluid is at substantially line pressure and the entrance of lubricant under pressure, as just described, may cause the development of bursting pressure within the valve plug. The present invention eliminates the development of bursting pressures within the plug by the provision of the leak port 58. The plug is normally maintained in sealing engagement with the head portion of the body by line pressure exerted against the bottom 56 of the plug, in addition to the spring 54. In closed position, due to the eccentric mounting of the plug within the body, sufficient clearance is present between the plug and body to permit the passage of line pressure beneath the bottom 56 and obviously, when the valve is in open position, fluid under pressure passing through the valve also may act against the bottom of the plug because of the leak port 58. With the valve in closed position it is obvious that the development of bursting pressures within the plug is prevented by the leak port 58 which permits the escape of lubricant under pressure into the ingress port of the valve body.

In assembling lubricated valves, it is usual to coat the plug with suitable lubricant prior to its insertion into the body. This initially fills the plug grooves and the inner and outer lubricant chambers 24 and 26. With the valve assembled as shown in Fig. 1, lubricant under pressure is forced by the ram 36 into the channel 32 from where it will pass to the upper recess 30 and then through grooves 28 into the outer lubricant chamber 26, and the lubricant will also pass by way of the dwarf grooves 45 and the plug grooves 46 to the lower lubricant recess 48. It will be apparent that should pressure be developed within the valve body in excess of the line pressure plus the action of the spring 54 the pressure at the upper end portion of the valve plug will cause axial movement of the plug within the body which will cause separation of the shoulder 12 and rib 22 from the head 14 and thus permit excess lubricant to escape from the interior of the valve body through the passage 20 and afford a visual signal denoting that the valve is sufficiently lubricated. The escape of lubricant as just described reduces the pressure within the valve body below the normal action of the spring 54 and the line pressure, hence the valve plug will assume its normal position wherein the shoulder 12 and rib 22 are in metal-to-metal contact with the head portion 14 and the valve thus effectually sealed at the head portion. The plug, as before mentioned, is coated with grease prior to its insertion into the valve body, hence the grooves 24 and 26 are initially filled. During axial shifting of the plug in the body to permit leakage of excess grease through the passage 20 it will be apparent that the grease grooves 24 and 26 are maintained filled with grease. It is to be understood that the contacting surfaces of the plug and valve body are suitably machined.

The valve of the present invention provides for effectively lubricating the contacting surfaces of a valve plug and valve body, as will be apparent from the description. The present valve also provides a means for preventing the building up of bursting pressures within the valve body by providing for leakage of lubricant through the head portion when the valve has been completely lubricated; the valve being so constructed that the plug shifts axially within the body to effect separation of the valve plug and head portion of the valve which normally are in metal to metal sealing contact, this separation providing for leakage of excess lubricant from the interior of the valve body. This valve is to be distinguished from a valve in which the plug is entirely surrounded by lubricant. The shoulder 12 and head portion 14 are arranged in metal to metal sealing contact, as it has been found that after a comparatively few turns of the plug within the body there is no lubricant remaining between the shoulder 12 and head portion 14, and the engagement is truly a metal to metal contact.

In valves of the type shown herein, when in closed position and line pressure is exerted against the plug, the latter shifts radially in the body. This obviously provides for leakage of lubricant under pressure into the interior of the plug. The present valve provides for eliminating the lubricant from the interior of the plug through the leak port 58 and then into the ingress line from where the lubricant is washed through the valve when the latter is again turned to open position. It is to be noted that the plug of the valve of the present invention is so formed that the contacting surfaces of the plug and valve body are reduced in area by the provision of the depressed portions 21 in the plug which enables the valve to be more easily operated than those heretofore and now being used in service.

From the above description it is believed that the construction and operation of the valve of the present invention will be fully apparent to those skilled in the art. The drawings illustrate one embodiment of the invention but it is to be understood that they are for illustrative purposes only and various changes in the form and proportions of the construction may be made within the scope of the appended claims without departing from the spirit of the invention.

What is claimed is:

1. In a lubricated valve, a plug, a valve body having an internal seat for the plug and provided with an integral head portion, a shoulder formed at the upper end portion of the plug and arranged to contact with the head portion in metal to metal sealing relation, concentrically arranged lubricant chambers defined between overlapping portions of the plug and valve body, the outer chamber extending to the internal seat in said body, a circumferential groove formed in the plug adjacent the upper end portion thereof adapted to hold lubricant to provide a seal between the body and the plug around the entire circumference of the latter, vertical grooves formed in the plug and connecting the outer lubricant chamber and the circumferential groove, a lubricant channel formed transversely in the plug with its ends in communication with the circumferential groove, a base plate for the body, a spring seated on the base plate and constantly urging the shoulder into engagement with the head portion, and means for forcing lubricant under pressure through the lubricant channel into the lubricant chambers.

2. In a lubricated valve comprising a valve body having a head portion and an internal plug seat and a plug rotatably fitting the seat, a shoulder formed on the upper end portion of the plug and contacting with the lower surface of the head portion, concentrically arranged lubricant chambers in the upper portion of the valve defined by overlapping portions of the plug and valve body, a lubricant channel formed transversely in the plug adjacent its upper end portion, vertical grooves formed in the outer surface of the plug connecting the outer lubricant chamber and transverse channel, a spring normally retaining the shoulder in engagement with the head portion of the body, and means for forcing lubricant under pressure through the channel and vertical grooves into the lubricant chambers.

3. In a lubricated valve, a valve body having a head portion and an internal plug seat, a plug rotatably fitted to said seat, a shoulder formed on the upper end portion of the plug, a spring below the plug normally retaining the shoulder and head portion in engagement, inner and outer lubricant chambers in the upper portion of the valve body defined between overlapping portions of the plug and body, a lubricant chamber extending transversely through the plug, vertical grooves formed in the outer surface of the plug and connecting the outer lubricant chamber with said transverse channel, cooperating longitudinal grooves formed respectively in the plug and body receiving lubricant from the transverse channel, and means for forcing lubricant under pressure through the transverse channel to the lubricant chambers and cooperating longitudinal grooves.

4. In a lubricated valve comprising a body having an integral head portion and an internal plug seat, a hollow plug rotatably fitted to said seat and capable of axial movement relative thereto, a shoulder at the upper end portion of the plug, a spring acting against the lower end portion of the plug and normally retaining the shoulder in sealing engagement with the head portion, a rib projecting upwardly from the plug intermediate the shoulder and marginal edge of the plug and forming one wall of adjacently arranged lubricant chambers defined in part by overlapping portions of the plug and valve body, a lubricant channel extending transversely through the plug, a circumferential groove formed in the outer surface of the plug at its upper end portion and in communication at opposite portions with said transverse channel, vertical grooves formed in the outer surface of the plug and extending between the circumferential groove and one of said lubricant chambers, and means for forcing lubricant under pressure through the channel to said outer chamber to cause axial movement of the plug in the body against the action of the spring when the pressure against the upper end portion of the plug exceeds the action of said spring whereby to effect separation of the shoulder and head portion and permit escape of excess lubricant from the body.

5. In a lubricated valve of the cylindrical plug type comprising a valve body and a valve plug seated therein and in which when the valve is closed and line pressure exerted against the plug the latter is eccentrically positioned within the body, a head portion secured to the valve body, a shoulder at the upper end portion of the plug, concentrically arranged inner and outer lubricant chambers in the valve defined by overlapping portions of the head portion and plug, a base plate closing the bottom of the valve body, a spring retaining the plug spaced from said base plate with the shoulder in metal-to-metal sealing contact with the head portion, means for forcing lubricant under pressure into the lubricant chambers and between the plug and seat, and a leak port formed in the bottom of the plug and communicating with the space therebelow for permitting passage of lubricant leaking into the interior of the plug from between the plug and its seat from the interior of the plug to the space therebelow.

6. In a lubricated valve, a valve body having a head portion and an internal longitudinal seat, a hollow plug rotatably fitting said seat and provided with a shoulder at its upper end portion engaging the lower surface of the head portion, an upwardly extending rib on the plug engaging the lower surface of the head portion, said rib being arranged intermediate the shoulder and the marginal edge of the plug and forming one wall of adjacently arranged lubricant chambers, a circumferential lubricant groove formed in the plug adjacent its upper end portion, vertically arranged grooves formed at the outer surface of the plug establishing connection between the outer lubricant chamber and said circumferential groove, a circumferential lubricant groove formed adjacent the lower end of the plug, dwarf grooves formed in the valve body and overlapping the upper circumferential lubricant groove, longitudinally arranged lubricant grooves formed terminating at and arranged in the plug with their lower ends in communication with the lower circumferential lubricant groove and their upper ends overlapping the dwarf grooves when the valve is in either closed or open position, and means for forcing lubricant under pressure into the lubricant chambers and through the longitudinal grooves in said plug.

7. In a lubricated valve, a valve body having an internal plug seat and a head portion, a hollow plug having a cylindrical seating surface rotatably fitting said seat, a shoulder formed on the upper end portion of the plug engaging the lower surface of the head portion in sealing relation, a lubricant chamber defined between overlapping portions of the plug and body at the upper end portion of the plug, a lubricant channel extending transversely through the plug, grooves formed in the seating surface of the plug and establishing communication between the transverse channel and the lubricant chamber, cooperating grooves in the plug and body receiving lubricant under pressure, spring means yieldingly holding the shoulder in engagement with the head portion of the valve, and means permitting escape of lubricant from the interior of the plug to the body below said plug when the valve is in closed position.

8. In a lubricated valve, a valve body having a cylindrical seat and a head, a plug rotatably mounted in the seat and capable of limited radial shifting in the body under the influence of line pressure exerted thereagainst when the valve is in closed position whereby sufficient clearance is present between the body and plug for at least a portion of the circumference of the latter to permit passage of lubricant into the interior of the plug, lubricant chambers formed in the upper end portion of the plug and covered by the head portion, a shoulder formed on the upper portion of the plug and engaging the head portion in sealing relation, a spring retaining the shoulder in sealing engagement with the head portion, means for forcing lubricant under pressure to the lubricant chambers and longitudinally of the valve between the body and plug whereby pressure within the valve body at the upper portion of the plug will cause axial movement of the plug against the action of the spring to separate the shoulder from the head portion and permit escape of lubricant from the body, and a leak port from the interior of the plug through which lubricant which has passed into the interior of the plug may escape into said body.

9. A valve comprising a body having a head portion and an internal cylindrical plug seat, said body being provided with a passageway therethrough, a cylindrical plug rotatably fitting said seat and having a transverse bore adapted to register with the passageway, concentrically arranged lubricant chambers within the body defined by overlapping portions of the plug and head portion, an upper lubricant recess formed circumferentially in the plug and connected with one of said lubricant chambers, a lower lubricant recess formed circumferentially in the plug at the lower end portion of the plug, longitudinal grooves formed in the plug and connected at their ends with the upper and lower circumferential recesses to form with the latter a pair of oppositely disposed continuous circuits which at all times are subject to lubricant pressure and which surround the passageway in the body when the valve is in either closed or open position, and means for forcing lubricant under pressure to the recesses, grooves and lubricant chambers, said lower circumferential recess constituting a lubricant arresting groove adapted to prevent passage of lubricant under pressure below the plug.

10. A plug for a lubricated valve comprising a substantially cylindrical body portion having a transverse bore therethrough, a stem formed with the body portion, a shoulder formed on the upper end portion of the body portion adjacent said stem, an annular rib projecting upwardly from the upper end portion of the plug intermediate the shoulder and the marginal edge of the body portion to provide a peripheral groove around the upper end portion of the plug, circumferential recesses formed in the outer surface of the body portion adjacent the upper and lower ends thereof, a lubricant channel extending transversely through the plug with its ends in communication with the upper circumferential recess, a reservoir in the stem communicating with the lubricant channel, and a leak port extending through the bottom of the plug from the transverse bore thereof.

11. A plug for a lubricated valve comprising a substantially cylindrical body portion having a transverse bore therethrough, a hollow stem for rotating the plug, a shoulder at the upper end portion of the body portion adjacent the stem, an annular rib projecting upwardly from the plug and so arranged as to provide a peripheral groove around the upper end portion of the plug, a transverse lubricant channel in the plug in communication with the interior of the stem, vertical grooves formed in the body portion extending from the channel to the peripheral groove, and a ram in the stem.

12. In a lubricated valve, a valve body having a head portion and an internal cylindrical plug seat, a plug rotatably fitting said seat and provided with a shoulder at its upper end portion arranged in metal to metal engagement with the head portion, the seating surface of said plug having longitudinally arranged depressed areas whereby to reduce the contacting surfaces of the plug and body, a lubricant chamber defined between overlapping portions of the head portion and plug, said plug having a hollow stem constituting a lubricant reservoir, means including a ram for forcing lubricant from the reservoir to the lubricant chamber, a circumferential lubricant receiving groove adjacent the upper end portion of the plug, longitudinal lubricant grooves formed in the seating surface of the plug having their upper ends in communication with the said circumferential lubricant groove, and a circumferential lubricant groove formed in the lower end portion of the plug with which the longitudinal lubricant grooves communicate and arranged in cooperation with the cylindrical plug seat in such a manner as to arrest passage of lubricant within the body to prevent lubricant from passing below the lower end of the plug.

ROBERT CLADE.
DAVID M. KNOX.

CERTIFICATE OF CORRECTION.

Patent No. 2,038,888. April 28, 1936.

ROBERT CLADE, ET AL.

It is hereby certified that error appears in the printed specification of the above numbered patent requiring correction as follows: Page 5, first column, line 1, claim 6, strike out the words "terminating at and arranged" and insert the same before "in", line 2, same claim; and that the said Letters Patent should be read with this correction therein that the same may conform to the record of the case in the Patent Office.

Signed and sealed this 15th day of September, A. D. 1936.

(Seal)

Henry Van Arsdale
Acting Commissioner of Patents.